3,167,535
PROCESS FOR HALOGENATION OF SYNTHETIC RESINS

George Gateff, Lakewood, and Harold H. Bowerman, Cleveland, Ohio, assignors to The B. F. Goodrich Company, New York, N.Y., a corporation of New York
No Drawing. Filed Apr. 2, 1962, Ser. No. 184,535
18 Claims. (Cl. 260—92.8)

The present invention relates generally to an improved process for the halogenation of synthetic vinyl resins and more particularly pertains to the improved method for rapidly chlorinating polyvinyl chloride resins comprising conducting the chlorination reaction in the presence of a reducing agent.

The chlorination of various types of polyvinyl chloride resins by various methods is disclosed in the textbooks "Polyvinylchloride and Vinylchloride-Mischpolymerizate," pp. 120–125, Springer, Berlin (1951), "Vinyl and Related Polymers," by C. A. Schildknecht (1952), and U.S. Patents 2,426,808, 2,590,651 and 2,996,489. The process of the present invention is similar to that disclosed in U.S. Patent No. 2,996,489 with the exception that a catalytic amount of a reducing agent is included in the chlorination reaction. Indeed, the novelty of the present invention lies in the unobvious and unexpected discovery that the rate of chlorination of a polyvinyl chloride resin can be greatly increased when conducted in the presence of a catalytic amount of a reducing agent without the necessity for any change in the reaction temperature or pressure. Moreover, the chlorinated polyvinyl chloride resin products of the present invention do not suffer any loss in physical or chemical properties over those possessed by chlorinated products of the older, slower reaction.

A process is described and claimed in U.S. Patent No. 2,996,489 for preparing chlorinated polyvinyl chloride resins having densities of from about 1.42 to 1.65 grams per cubic centimeter at 25° C. and having exceptionally high heat distortion temperatures and unusually good heat stability in the unstabilized condition particularly when compared with the original polyvinyl chloride resins. The process of U.S. 2,996,489 comprises the chlorination of a polyvinyl chloride resin in an aqueous suspension in the presence of a chlorohydrocarbon swelling agent and in the presence of ultraviolet light at a temperature no greater than 65° C. The polyvinyl chloride resin of the process of the aforementioned patent is preferably a macrogranular, somewhat porous resin and the process is preferably carried out in the presence of an excess of chlorine and in the substantial absence of oxygen. The instant invention embodies the process of U.S. 2,996,489 and in addition requires the presence of a catalytic amount of a reducing agent and is further distinguished in not requiring the substantial absence of oxygen.

We have discovered the improved process for halogenating at a rapid rate a polyvinyl chloride resin by reacting a halogen with a granular polyvinyl chloride resin suspended in a liquid aqueous medium in the presence of a chlorohydrocarbon swelling agent, ultraviolet light and a catalytic amount of a reducing agent at a temperature no greater than about 65° C.

General purpose types of commercially available polyvinyl chloride have specific viscosities of 0.50 to 0.54, contain about 56.7% by weight chlorine, have an ASTM density of about 1.40 g./cc., and have a second order transition temperature of between about 75° and about 80° C. When, by the process of this invention, the density of the lightly-chlorinated polyvinyl chloride resin has been increased slightly, up to a maximum of about 1.42, a lightly chlorinated product is obtained having an improved stability to heat and light and a second order transition temperature usually above about 80° C. While the reason for this improvement in properties is not clear, it may be that chlorination converts the small amount of unstable groupings (usually found in commercial-grade resins) to a more stable chlorinated form. For example, there is evidence that the commercial polyvinyl chlorides contain a small proportion of unsaturation which the chlorine may saturate by addition. Only about 0.1 to 0.2% by weight of chlorine is necessary to achieve this effect.

When, however, the chlorination is continued to the density range of about 1.43 to about 1.48, the product changes even more profoundly. Most surprisingly, these materials process more easily, without plasticizer, than the original resin, and at about the same processing temperatures. Also, the second order transition temperature increases rapidly to a value in the range of 80° to 90° C. and the product has a dipole peak (peak in the curve of a plot of loss factor vs. temperature at 1000 cycles) in the range of 105° to 115° C. Also the resistance of the chlorinated polymer to heat is considerably improved as shown by the fact that stabilizer-free samples withstand heating in air for 10 to 20 minutes or more at 375° F. Such improvement in heat stability is additive and synergistic with the action of conventional stabilizers. Resinous processing aids or other lubricants do not seem to be required for the formation of smooth milled sheets, although these latter materials may be used, if desired. Upon milling, the chlorinated resin forms a smooth sheet and clings to one of the rolls of a two roll plastic mill at temperatures between 300° and 350° F. without breaking into the loose, lacy appearance characteristic of plasticizer-free polyvinyl chloride. Because of their easy processability this class of materials avoids the sensitivity to chemical attack introduced upon the addition of processing aids to unchlorinated polyvinyl chloride in rigid formulations.

Further increase in density in the range of from 1.50 to about 1.54 produces resinous materials which are exceptionally hard, stiff, and tough, yet which can be processed in conventional plastics processing equipment capable of being heated to 350° F. Chlorinated polyvinyl chlorides of this type exhibit a second order transition temperature of at least 110° C. and, even when suitably lubricated and stabilized, have a softening point at least 20° C. higher than similar formulations of the original polyvinyl chloride. Because of the very materially increased processing temperatures required, this material, to be considered stable, must withstand heating in air for at least 20 minutes at 400° F. when suitably stabilized. Materials in this density range are quite tough as indicated by Izod impact values of at least 0.6 pound per inch of notch, usually between about 0.6 and about 0.8 pound per inch of notch, without the addition of fillers and reinforcing materials.

When the chlorination reaction has progressed to a density of above about 1.58, and particularly in the range of above about 1.58 to about 1.65, the product has a second order transition temperature of at least about 130° C. For processing, these materials require stock temperatures above about 400° F. yet are easily molded or pressed to form clear sheets in as little as 1 minute at 400° F. under pressure of 5,000–10,000 pounds per square inch.

Still further increases in density produce what is essentially high molecular weight poly-1,2-dichloroethylene having a density of 1.69 to 1.71 (theoretically 1.70). Such a material is most difficult to process by ordinary techniques although the special techniques and equipment developed for the high-softening polyfluoroethylene resins can be employed. These products can be powder-sintered at 400–525° F. to form products of exceptional heat resistance. These materials have second order transition temperatures in the range of 170–180° C. or more, and heat resistance values of 20 minutes or more at 375° F. in the unstabilized condition.

Products answering the foregoing description are made by the photochemically-induced chlorination of granular particles of high quality, high molecular weight polyvinyl chloride resin at a temperature below 65° C. while suspended in an essentially inert liquid medium having at most a mild swelling action on the polymer and in the presence of from about 0.01 to 5 parts by weight of a reducing agent per 100 parts by weight of the polyvinyl chloride resin, while maintaining an excess of dissolved chlorine, especially in those portions of the reaction mixture most strongly exposed to the photochemical activation. More preferred in the present process is the use of from about 0.1 to 1 part by weight of reducing agent per 100 parts of polyvinyl chloride resin.

It has been found that in addition to the known rate determining factors, namely, (1) the dissolved chlorine content, (2) the level of photochemical activation, and (3) reaction temperature, that unexpectedly high reaction rates may be obtained in the presence of a catalytic amount of a reducing agent with no change in the foregoing (1), (2) or (3) factors. When attempts are made to increase the rate of the reaction either by increasing the chlorine content (pressure), by raising the reaction temperature (above 65° C.), or increasing the intensity of illumination or all three, there results an inferior product having poor heat stability and decidedly lower softening point. The inclusion of a catalytic amount of a reducing agent of the type hereinafter described in a normal reaction designed to yield chlorinated polyvinyl chloride of superior properties causes a decided increase in reaction rate without the attendant loss of any of the desirable physical or chemical properties of the product.

For greatly increased stability in the product it is necessary to employ, as the swelling agent, a chlorinated hydrocarbon having from 1 to 4 carbon atoms and containing at least one chlorine and one hydrogen substituent. A chloromethane is preferred, that is a chlorinated methane containing at least one hydrogen. Such preferred ma- and trichloromethane (chloroform). The chloromethand trichloro methane (chloroform). The chloro methanes are greatly preferred over other chlorinated hydrocarbons because they react but slowly with chlorine and the final product of such reaction is carbon tetrachloride, an innocuous material easily removed from final polymer. Chlorinated ethylene and ethane derivatives, and other chlorinated higher alkyl hydrocarbons are readily converted to high-boiling polychloro derivatives which are extremely difficult to remove from the product.

In the process of this invention, the starting material must be a polyvinyl chloride resin having a specific viscosity of at least as high as 0.40. The specific viscosity is determined by dissolving 0.35 gram of the resin in 25 ml. of tetrahydrofuran and the solution is then filtered into an appropriate Ubbelohde viscometer, previously calibrated for the pure solvent. The flow times in seconds for the solutions are determined at four different dilutions. A portion of the original filtered solution is dried to constant weight at 130° C. to obtain a true concentration value. The ratio of flow time to the flow time of the pure solvent is the relative viscosity. When the number (1) is subtracted from the relative viscosity one obtains the specific viscosity.

The macro-granular form of polyvinyl chloride resin is required to obtain the low slurry viscosity necessary for efficient agitation and to obtain low viscosity at high solids levels. It is necessary to agitate the chlorination medium quite vigorously in order to facilitate chlorine solution and distribute the chlorine to each of the suspended resin particles. As used herein, the term "macrogranular" means a granular resin in which essentially all of the particles are above about 0.5 micron in diameter. Resins containing a preponderance of particles above 10 microns may be used. In fact, the coarsely granular grades of resin designated "Type GP" in ASTM D1755–60T containing particles up to 200 microns or more in diameter may be used and these are preferred.

The proportion of such a resin in the slurry-like reaction mixture may vary quite widely up to a concentration of about 35–40% by weight. No real lower limit on slurry solids content exists, although practical economic considerations require a minimum of not less than about 5–10%. High solids levels are possible with macrogranular resins whereas extremely fine resins exhibit much higher viscosities.

It is preferred that the starting polyvinyl chloride resin be somewhat porous in nature. Although solid, non-porous resins such as the "Type D" grade in ASTM designation D1755–60T are within the scope of the present invention, they are not preferred. Polyvinyl chloride resins containing from about 5 to about 50% by volume of pore space are most preferred in the instant process.

By the term "polyvinyl chloride resin" is meant any thermoplastic polymer produced from a monomeric mixture containing not less than about 75% by weight of vinyl chloride. Thus copolymers of vinyl chloride with minor amounts of one or more 1-monoolefinic or vinyl-type comonomers can be utilized. Illustrative comonomers are vinylidene chloride, vinyl acetate, isopropenyl acetate, methyl acrylate, ethyl acrylate, 2-ethyl hexyl acrylate, styrene, alpha-methyl styrene, methyl methacrylate, ethylmethacrylate, acrylonitrile, maleic esters, fumarate esters, ethylene, propylene, and others. Polyvinyl chloride (i.e., the homopolymer) is greatly preferred.

As indicated above, the reaction mixture in the instant process must be maintained at a temperature below about 65° C. in order to obtain stable products. The products prepared by the process embodied herein at 55° C. are superior to those made at 65° C. and those prepared at 45° C. are better than those prepared at 55° C.

In the instant process oxygen may be excluded, although it is not necessary to make special efforts to do so. The elimination of the necessity for evacuation and sweeping of the reaction mixture with an inert gas is a real economic advantage in the commercial operation.

The chlorination process of this invention has been found to proceed very slowly, or not at all, in the total absence of light. Moreover, the catalytic action of the reducing agent is not apparent when the chlorination reaction is conducted in the absence of light at higher pressures and temperatures as disclosed in the copending patent application of Joseph C. Shockney, Serial No. 101,654, filed April 10, 1961, now U.S. Patent No. 3,100,762. Peroxides and azo catalysts cannot be substituted for light in the present process. The reducing agents embodied herein have no apparent accelerating effect when the chlorination process is carried out in the presence of a peroxide catalyst or an azo catalyst and the chlorinated product has relatively poor physical and chemical properties. However, the source of actinic radiation for photochemical activation does not appear to be critical in the process of this invention. In transparent glass laboratory equipment, the ambient room illumination level supplied by a high level fluorescent lighting system has been found sufficient to induce reaction. Better control of illumination level is afforded by employing sources of artificial light in close proximity to the reaction medium. Ordinary incandescent lamps have proven satisfactory, however, less sensible heat for a given level of activation will be realized from mercury vapor or arc lamps. Neon glow tubes, fluorescent tubes, carbon arcs, and sodium vapor lamps may also be employed.

Following completion of the chlorination step, the polymer slurry may simply be filtered or centrifuged to free it of liquid phase, however, it is advantageous to first separate most of the liquid phase from the resin by decantation procedures. Free acid in the resin cake is neutralized by the addition of water-soluble alkaline material such as sodium, ammonium or potassium hydroxides, carbonates, etc. to an aqueous slurry of the resin particles. The neutralized polymer is again separated from the liquid phase, and then washed with pure water to remove residual electrolyte.

Drying of the washed cake can be carried out in air or vacuum ovens, by suspension driers, and the like employing temperatures preferably below 75° C. The water-wetted filter cake can be washed with alcohol or acetone to displace the absorbed water and then the alcohol- or acetone-wetted polymer dried in a vacuum oven at very moderate temperatures of about 50° C. Where it is desired to recover the chloromethane and its chlorinated products, the reaction slurry can be steam distilled and then worked up as described above.

Generally speaking, the reducing agents embodied in the present invention are materials which are capable of readily undergoing an increase in oxidation state. The reducing agents useful herein tend to go to higher oxidation states readily or to lose electrons readily by being oxidized. The exact mechanism whereby the reducing agents of this invention accelerate the halogenation reaction is not fully understood although it does appear to be a catalytic effect rather than a simple oxygen-scavenging reaction. There is no apparent induction period in reactions carried out in a reactor which has not previously been flushed free of air with nitrogen or other inert gas when the reducing agent catalysts of the present invention are used. Generally under such conditions the amount of reducing agent employed is far below the theoretical amount needed to scavenge all the oxygen present in the reactor.

More specifically, the reducing agents of the present invention may be organic compounds such as aliphatic and aromatic aldehydes and sulfonates thereof, such as formaldehyde, chloral, benzaldehyde, acrolein, sodium formaldehyde, sulfoxylate, sodium formaldehyde bisulfite, enolic compounds, phenols, polyhydric phenols, thiophenols, mercaptans, Grignard reagents, carbohydrates such as reducing sugars, ethers, unsaturated acids, l-ascorbic acid, d-ascorbic acid, dihydroxy maleic acid, organic sulfinic acids, oxalic acid and metallic salts thereof, inorganic compounds such as silver nitrate, metallic sulfoxides such as the bisulfites, thiosulfates, metabisulfites, hydrosulfites, sulfites, phosphites, pyrophosphates, and the like.

Most preferred in the present invention are the water-soluble metallic salts of oxygen compounds of sulfur wherein the valence of sulfur is less than six such as the alkali metal sulfites, metabisulfites, bisulfites, hydrosulfites, etc., and compounds having the formula

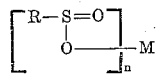

in which R is a hydrocarbon group having from 1 to 8 carbon atoms, $n$ is an integer of from 1 to 2 and M is a metal such as lithium, sodium, potassium, zinc, and the like. Compounds illustrative of the class of reducing agents of the foregoing formula include sodium formaldehyde sulfoxylate, zinc formaldehyde sulfoxylate, potassium formaldehyde sulfoxylate, zinc acetaldehyde sulfoxylate, sodium acetaldehyde sulfoxylate, potassium acetaldehyde sulfoxylate, zinc propionaldehyde sulfoxylate, zinc propionaldehyde sulfoxylate, sodium propionaldehyde sulfoxylate, potassium propionaldehyde sulfoxylate, sodium benzaldehyde sulfoxylate, and the like.

Also included in the most preferred list mentioned above are (a) aldehydes having the structure $R'—(CHO)_x$ wherein $R'$ is hydrogen or a hydrocarbon radical having from 1 to 12 carbon atoms and $x$ is an integer of from 1 to 2 inclusive and (b) the reducing sugars which are commonly defined as mono- and di-saccharides (such as glucose or fructose) which reduce copper or silver salts in alkaline solutions (e.g. Fehling's Solution).

In the following illustrative examples the amounts of ingredients are expressed in parts by weight unless otherwise indicated.

*Example I*

A glass-lined reactor was charged with the following ingredients:

| | |
|---|---|
| Polyvinyl chloride [1] | 500 |
| Demineralized water | 1200 |
| Chloroform | 160 |

[1] An easy processing general purpose resin having a specific viscosity of about 0.54 and density of 1.40 g./cc. at 25° C. A fairly coarse, granular resin which passes through a 42 mesh screen and is retained 100% by a 200 mesh screen. The preponderance of particles are larger than 25 microns in diameter and they are porous, the pore space being from about 15 to 20% by volume of the total volume of the particles.

The reactor contained a 200 watt lamp which served as the source of illumination. The mixture was purged with nitrogen until there was essentially no oxygen in the gas phase. Rapid agitation was used (144 r.p.m.), the reaction temperature of 45–50° C. was maintained, the flow of chlorine gas to the reactor was commenced, a 4 p.s.i.g. chlorine pressure was maintained and the lamp was then illuminated. Under the foregoing conditions a reaction time of 7 hours was required to produce a chlorinated polyvinyl chloride having a density of 1.57 g./cc. at 25° C. The product had the following physical properties:

| | |
|---|---|
| ASTM heat distortion temperature, ° C. | 108 |
| Heat stability at 400° F. (time to turn black), min. | 45 |
| Tensile, p.s.i. | 9300 |

In a similar manner the foregoing reaction was carried out with the exception that no purging with nitrogen was used and 2 parts of sodium formaldehyde sulfoxylate was included in the reaction mixture. A reaction time of 4 hours was required to produce a product having a density of 1.57 g./cc. at 25° C. and having the following properties:

| | |
|---|---|
| ASTM heat distortion temperature, ° C. | 113 |
| Heat stability at 400° F. (time to turn black), min. | 50 |
| Tensile, p.s.i. | 9300 |

*Example II*

In a manner similar to that described in Example I a series of chlorinated polyvinyl chlorides was prepared in a laboratory reactor equipped with a 100 watt light. The following recipe was used:

| | | |
|---|---|---|
| Granular, porous polyvinyl chloride | g | 800 |
| Chloroform | g | 260 |
| Reducing agent | g | 8 |
| Distilled water | g | 2000 |
| Agitator, r.p.m. | | 500 |

The reaction procedure followed in Example I was followed and a 3 hour reaction time was used in each case. The results obtained are given in the following table. Only in the control (no reducing agent) experiment was nitrogen purging used.

| Reducing agent | Density of product, g./cc. at 25° C. |
|---|---|
| None | 1.562 |
| $Na_2SO_3$ | 1.588 |
| Sodium metabisulfite | 1.590 |
| Sodium bisulfite | 1.582 |
| Sodium hydrosulfite | 1.590 |
| Sodium thiosulfate | 1.576 |
| Sodium formaldehyde sulfoxylate | 1.592 |
| Ammonium sulfite | (1) |

[1] No reaction at all.

The products of the foregoing reactions all had excellent physical and chemical properties which were comparable to those chlorinated polyvinyl chlorides of the same density prepared by the procedure of U.S. Patent 2,996,489.

A repeat of the foregoing reaction wherein no reducing agent and no purging were used resulted in no apparent chlorination reaction.

*Example III*

In a manner similar to that described in Example I a series of chlorinated polyvinyl chlorides were prepared in a laboratory reactor equipped with a 100 watt light. The following recipe was used:

| | |
|---|---:|
| Granular, porous polyvinyl chloride | 800 |
| Chloroform | 260 |
| Reducing agent | 4.0 |
| Distilled water | 2600 |
| Agitator, r.p.m. | 500 |

The reaction procedure of Example I was followed and a 2½ hour reaction period was used in each case. The results obtained are given in the following table. Only in the control (no reducing agent) experiment was nitrogen purging used.

| Reducing agent | Density of product, g./cc. at 25° C. |
|---|---|
| None | 1.570 |
| Acetaldehyde | 1.637 |
| Benzaldehyde | 1.594 |
| Formaldehyde (trimer) | 1.590 |
| Maltose | 1.592 |
| Dextrose | 1.595 |

The products of the foregoing reaction all had excellent physical and chemical properties which were comparable to those chlorinated polyvinyl chlorides of corresponding density prepared by the procedure claimed in U.S. Patent No. 2,996,489.

Attempts to speed up the chlorination reaction described above in the absence of a reducing agent by means of increasing the temperature above about 65° C., by using high shear agitation and by increasing the reaction pressure all resulted in products which had much lower heat distortion temperatures and much inferior heat stability than the products resulting from the process embodied in this invention.

The use of a reducing agent such as sodium formaldehyde sulfoxylate was completely ineffective in the process described in the copending patent application of Joseph C. Shockney, Serial No. 101,654, filed April 10, 1961, now U.S. Patent No. 3,100,762, wherein the chlorination of a porous macro-granular polyvinyl chloride was carried out in an aqueous medium in the presence of a chloroform swelling agent at a temperature of from 60 to 100° C., a pressure of from 20 to 80 p.s.i.g. and in the absence of light.

We claim:

1. In the process for chlorinating a polyvinyl chloride resin selected from the group consisting of homopolymers of vinyl chloride and copolymers of vinyl chloride with a copolymerizable monomer selected from the group consisting of vinylidene chloride, vinyl acetate, isopropenyl acetate, methyl acrylate, ethyl acrylate, 2-ethyl hexyl acrylate, methyl methacrylate, ethyl methacrylate, acrylonitrile, ethylene and propylene, wherein at least 75% by weight of the copolymer is polymerized vinyl chloride units, comprising the steps of preparing a suspension of the polyvinyl chloride resin composed of macro-granular particles within the range of from about 0.5 micron to about 200 microns in a liquid aqueous medium containing, as a swelling agent for the polyvinyl chloride resin, a saturated chlorohydrocarbon having from 1 to 4 carbon atoms and containing at least one chlorine and at least one hydrogen substituent, substantially saturating the liquid aqueous medium of the suspension with gaseous chlorine, inducing the chlorination reaction between the chlorine and the polyvinyl chloride resin in said suspension by photo-illumination, maintaining the reaction at a temperature no greater than about 65° C. and maintaining an excess of dissolved chlorine in said suspension over that momentarily reacting with the suspended resin, terminating the reaction when the desired amount of chlorination of the resin has been achieved by extinguishing the photo-illumination, separating the chlorohydrocarbon-swollen chlorinated polyvinyl chloride resin product from the aqueous medium, neutralizing said product, and separating the chlorohydrocarbon from said product; the improvement which comprises carrying out said chlorination in the presence of a catalytic amount of at least one reducing agent selected from the group consisting of (a) alkali metal sulfides, alkali metal metabisulfites, alkali metal bisulfites, alkali metal hydrosulfites and (b) a compound having the structure

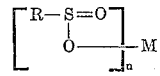

wherein R is a hydrocarbon group having from 1 to 8 carbon atoms, $n$ is an integer of from 1 to 2 and M is a metal and (c) an aldehyde having the structure $R'—(CHO)_x$ wherein R' is a member of the group consisting of hydrogen and a hydrocarbon group having from 1 to 10 carbon atoms and (d) a reducing sugar.

2. In the process for chlorinating a polyvinyl chloride resin selected from the group consisting of homopolymers of vinyl chloride and copolymers of vinyl chloride with a copolymerizable monomer selected from the group consisting of vinylidene chloride, vinyl acetate, isopropenyl acetate, methyl acrylate, ethyl acrylate, 2-ethyl hexyl acrylate, methyl methacrylate, ethyl methacrylate, acrylonitrile, ethylene and propylene, wherein at least 75% by weight of the copolymer is polymerized vinyl chloride units, comprising the steps of preparing a suspension of the polyvinyl chloride resin composed of macro-granular particles within the range of from about 0.5 micron to about 200 microns in a liquid aqueous medium containing chloroform as a swelling agent for the polyvinyl chloride resin, substantially saturating the liquid aqueous medium of the suspension with gaseous chlorine, inducing the chlorination reaction between the chlorine and the polyvinyl chloride in said suspension with ultraviolet light, maintaining the reaction at a temperature no greater than about 65° C. and maintaining an excess of dissolved chlorine in said suspension over that momentarily reacting with the suspended resin, terminating the reaction when the desired amount of chlorination of the resin has been achieved by extinguishing the ultraviolet light, separating the chloroform-swollen chlorinated polyvinyl chloride resin product from the aqueous medium, neutralizing said product, and separating the chloroform from said product; the improvement which comprises carrying out said chlorination in the presence of from about 0.01 to about 5 parts by weight, per 100 parts by weight of said polyvinyl chloride resin, of at least one reducing agent selected from the group consisting of (a) alkali metal sulfides, alkali metal metabisulfites, alkali metal bisulfites, alkali metal hydrosulfites and (b) a compound having the structure

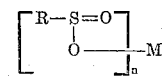

wherein R is a hydrocarbon group having from 1 to 8 carbon atoms, $n$ is an integer of from 1 to 2 and M is a metal and (c) an aldehyde having the structure $R'—(CHO)_x$ wherein $R'$ is a member of the group consisting of hydrogen and a hydrocarbon group having from 1 to 10 carbon atoms and (d) a reducing sugar.

3. The process of claim 1 wherein the polyvinyl chloride resin is the homopolymer of vinyl chloride.

4. The process of claim 1 wherein the reducing agent is a water-soluble metallic salt of a sulfur oxygen compound wherein the valence of sulfur is less than six.

5. The process of claim 1 wherein the polyvinyl chloride has a pore space of from about 5 to about 50% by volume.

6. The process of claim 5 wherein the chlorohydrocarbon swelling agent is a chloromethane.

7. The process of claim 6 wherein the reducing agent is sodium formaldehyde sulfoxylate.

8. The process of claim 6 wherein the reducing agent is sodium sulfite.

9. The process of claim 6 wherein the reducing agent is sodium metabisulfite.

10. The process of claim 6 wherein the reducing agent is sodium bisulfite.

11. The process of claim 6 wherein the reducing agent is sodium hydrosulfite.

12. The process of claim 6 wherein the reducing agent is sodium thiosulfate.

13. The process of claim 6 wherein the reducing agent is acetaldehyde.

14. The process of claim 6 wherein the reducing agent is benzaldehyde.

15. The process of claim 6 wherein the reducing agent is formaldehyde trimer.

16. The process of claim 6 wherein the reducing agent is maltose.

17. The process of claim 6 wherein the reducing agent is dextrose.

18. The process of claim 2 wherein the polyvinyl chloride resin is a homopolymer of vinyl chloride.

References Cited by the Examiner
UNITED STATES PATENTS

| | | | |
|---|---|---|---|
| 2,996,489 | 8/61 | Dannis et al. | 260—92.8 |
| 3,033,838 | 5/62 | Ray | 260—96 |

JOSEPH L. SCHOFER, *Primary Examiner.*

WILLIAM H. SHORT, *Examiner.*

UNITED STATES PATENT OFFICE

CERTIFICATE OF CORRECTION

Patent No. 3,167,535　　　　　　　　　　　　January 26, 1965

George Gateff et al.

It is hereby certified that error appears in the above numbered patent requiring correction and that the said Letters Patent should read as corrected below.

Column 3, line 43, for "and trichloromethane (chloroform). The chlorometh-" read -- terials include monochloro methane, dichloro methane --; column 6, line 20, for "200 watt" read -- 2000 watt --; column 7, in the table, second column, line 5 thereof, for "1.592" read -- 1.595 --; line 6 thereof, for "1.595" read -- 1.592 --.

Signed and sealed this 28th day of September 1965.

(SEAL)
Attest:

ERNEST W. SWIDER
Attesting Officer

EDWARD J. BRENNER
Commissioner of Patents